United States Patent [19]

Sommer et al.

[11] Patent Number: 4,819,700

[45] Date of Patent: Apr. 11, 1989

[54] SYSTEM FOR LOADING BULK CONTAINERS WITH FLUENT MATERIAL FROM OVERHEAD STORAGE BIN

[75] Inventors: Tracy W. Sommer; Charles D. Hill; Dean P. Muka; Ryland S. Beecham, all of Mt. Pleasant, S.C.

[73] Assignee: Amoco Corporation, Chicago, Ill.

[21] Appl. No.: 33,671

[22] Filed: Apr. 3, 1987

[51] Int. Cl.⁴ .......................... B65D 25/16; B65B 3/28
[52] U.S. Cl. ............................................ 141/1; 141/59; 141/83; 141/114; 141/231; 141/382; 141/383
[58] Field of Search ........................................ 141/1–12, 141/85–93, 114, 83, 59, 128, 231–233, 39, 382–386

[56] References Cited

U.S. PATENT DOCUMENTS

| | | | |
|---|---|---|---|
| 2,075,931 | 4/1937 | Eades | 141/232 |
| 3,788,368 | 1/1974 | Geng et al. | 141/93 |
| 3,863,688 | 2/1975 | Millar et al. | 141/59 |
| 3,868,238 | 2/1975 | Mills et al. | 141/93 |
| 3,911,975 | 10/1975 | van Soestbergen et al. | 141/232 X |
| 3,951,284 | 4/1976 | Fell et al. | 141/10 |
| 4,061,221 | 12/1977 | Higashinaka | 141/93 |
| 4,182,591 | 1/1980 | Stanelle | 141/93 |
| 4,337,802 | 7/1982 | Kennedy et al. | 141/1 |
| 4,360,045 | 11/1982 | Ahlers | 141/39 |
| 4,460,308 | 7/1984 | Moon et al. | 141/83 X |
| 4,629,392 | 12/1986 | Campbell et al. | 141/83 X |

Primary Examiner—Henry J. Recla
Assistant Examiner—Ernest G. Cusick
Attorney, Agent, or Firm—Gunar J. Blumberg; William H. Magidson; Ralph C. Medhurst

[57] ABSTRACT

A process, apparatus, and associated controls are provided in a system for loading bulk material into a flexible, collapsed container from an overhead storage bin. The container can be positioned on a scale in the loading station. A dicharge conduit from the bin is connected to a discharge spout which is movable into communication with the container. An exhaust conduit from a dust collection system is connected to an exhaust spout which is also movable into communication with the container. The discharge and exhaust spouts are mounted on a carriage movable on a platform toward and away from the container. The platform is movable transversely of the container between a loading position behind the container and a retracted position which accommodates movement of the container therepast. A line is provided for supplying inert gas to the discharge spout. Valves are provided on the exhaust conduit, discharge conduit, and inert gas line for controlling the flows through the conduits. The valves are automatically controlled to inflate the container, to fill the container with the material from the storage bin while exhausting the dust from the container, and to clean out the discharge conduit after the container has been loaded.

25 Claims, 2 Drawing Sheets

SYSTEM FOR LOADING BULK CONTAINERS WITH FLUENT MATERIAL FROM OVERHEAD STORAGE BIN

This invention relates to a process, associated apparatus, and associated controls in a system for loading bulk material into a suitable bulk cargo container. The process, apparatus and controls are suitable for use with bulk loading of fluent material, including flowable comminuted solids and the like, from an elevated storage bin into the container which is typically carried on a truck or a trailer to a loading position below the storage bin. The present invention is especially useful for filling a standard rear-entry bulk material bag fitted into a container to a predetermined load weight.

BACKGROUND OF THE INVENTION

Conventional rear-entry, bag-type bulk containers are provided in standard nominal lengths of 20 feet and 40 feet for carrying dry, free-flowing, powder material which is typically stored in silos or storage bins. Such conventional containers typically include a flexible polyethylene envelope or bag provided with an appropriate closure while carried on a trailer or other suitable conveyance. After the envelope or bag is filled through a rear opening, it is suitably closed and sealed to prevent moisture contamination and release of the contents.

Conventional methods for loading such containers include conveyance systems employing pneumatic and-/or auger conveyors. Although such conventional systems may operate generally satisfactorily as designed, they are relatively slow. Thus, it would be desirable to provide a loading system that does not require costly conveying apparatus and that reduces loading time. When large quantities of material must be loaded into a great number of containers, even a savings of a few minutes on each container loading operation can be significant.

Additionally, it would be beneficial if an improved loading system could be provided to accommodate vehicle-mounted containers which can be driven unidirectionally into a pass-through type loading station seriatim, with each container being stopped for a relatively short time period in the station during the actual loading operation.

Additionally, it would be advantageous if such an improved system could be provided with, or at least accommodate, automatic or semiautomatic loading mechanisms and associated controls for one-man operation.

Finally, it would be desirable to provide an improved loading system with means for accommodating the use of standard bulk bags while providing relatively accurate yet rapid loading with simultaneous weighing of the particulate material being loaded. The present invention satisfies the foregoing desires.

SUMMARY OF THE INVENTION

One aspect of the present invention provides a connector assembly for bulk-loading fluent particulate material from an elevated storage bin into a container through an opening in the container. The connector assembly includes a discharge conduit that is connected in communication with the storage bin and that is movable between (1) a retracted position to accommodate the positioning of the container at a loading station and (2) a downwardly extended position. The assembly also includes a discharge spout and support means for supporting the discharge spout for movement along (1) a first path toward and away from the discharge conduit to accommodate passage of the container into the loading station and (2) toward and away from the first path along a second path perpendicular to the first path. The discharge spout has an inlet for being releasably connected to the discharge conduit and has an outlet for communicating with the container opening.

In a preferred form of the invention, the connector assembly is included in a bulk-loading system which also includes an exhaust conduit, exhaust spout, and associated dust collection means for effecting the flow of dust through the exhaust conduit. An exhaust conduit has one end connected to the dust collection means and an inlet at the other end which is movable at least vertically. The exhaust spout is supported by the support means for movement with the discharge spout. The exhaust spout has an outlet for being releasably connected to the exhaust conduit and has an inlet for communicating with the container opening.

In the preferred embodiment, the means for supporting the discharge spout and exhaust spout include a platform movable transversely of the container length behind the container loading location so as to position the spouts below the discharge and exhaust conduits. The discharge and exhaust conduits are mounted together and terminate in spouts on a carriage such as rollers on the platform. The spouts are movable relative to the platform toward and away from the container.

Further, a gas injection line is provided for injecting gas into the discharge spout for inflating the container liner, for varying the distribution of material flowing into the container, and for blowing material out of the discharge spout to completely empty the discharge spout.

According to the process of the present invention, the container in the form of a collapsed bag or envelope is first positioned in the loading station below the storage bin. The envelope is then inflated with gas. The weight of the container and its carrier is determined prior to loading the container. Material is discharged from the bin into the container and, if a dust collection system is provided, the container interior is exhausted to the dust collection system during the loading. The weight of the container is measured during the loading, and the filling of the container is terminated when the measured weight equals a predetermined value.

Suitable valves can be provided for accommodating at least semiautomatic operation of the system. A valve is provided in the gas injection line for operation by the control system to initially open the valve to inflate the collapsed bag or envelope. A valve operable by the control system is provided in the discharge conduit to fill the container with material and adjust the flow rate of material into the container as a function of time prior to being fully closed. This is useful for providing more even distribution of material in relatively longer containers.

Preferably, a scale is provided at the loading station for weighing the container before and during the loading operation. The control system is responsive to the sensing of the container weight by the scale so as to terminate filling of the container at a predetermined weight load. Further, gas is injected into the discharge spout after the container has been loaded so as to blow out any residual material remaining in the discharge spout prior to removing the discharge spout from the container.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same:

FIG. 2 is a rear-elevational view taken along the plane 2—2 in FIG. 1;

FIGS. 4A and 4B are schematic diagrams of the system of the present invention showing associated instrumentation and control apparatus which is not visible in, or has been omitted from, FIGS. 1–3.

DESCRIPTION OF THE PREFERRED EMBODIMENT

While this invention is susceptible of embodiment in many different forms, this specification and the accompanying drawings disclose only some specific forms as an example of the use of the invention. The invention is not intended to be limited to the embodiments so described, and the scope of the invention will be pointed out in the appended claims.

The precise shapes and sizes of the components herein described are not essential to the invention unless otherwise indicated.

For ease of description, the apparatus of the invention is described in the normal (upright) operating position, and terms such as upper, lower, horizontal, etc., are used with reference to this position. It will be understood, however, that the apparatus of this invention may be manufactured, stored, transported, and sold in an orientation other than the position described.

The apparatus of this invention is used with certain conventional components, the details of which, although not fully illustrated or described, will be apparent to those having skill in the art and an understanding of the necessary functions of such components.

Some of the figures illustrating the preferred embodiment of the apparatus show structural details and mechanical elements that will be recognized by one skilled in the art. However, the detailed descriptions of such elements are not necessary to an understanding of the invention, and accordingly, are not herein presented.

GENERAL ARRANGEMENT OF THE APPARATUS

Figures 1, 1A:
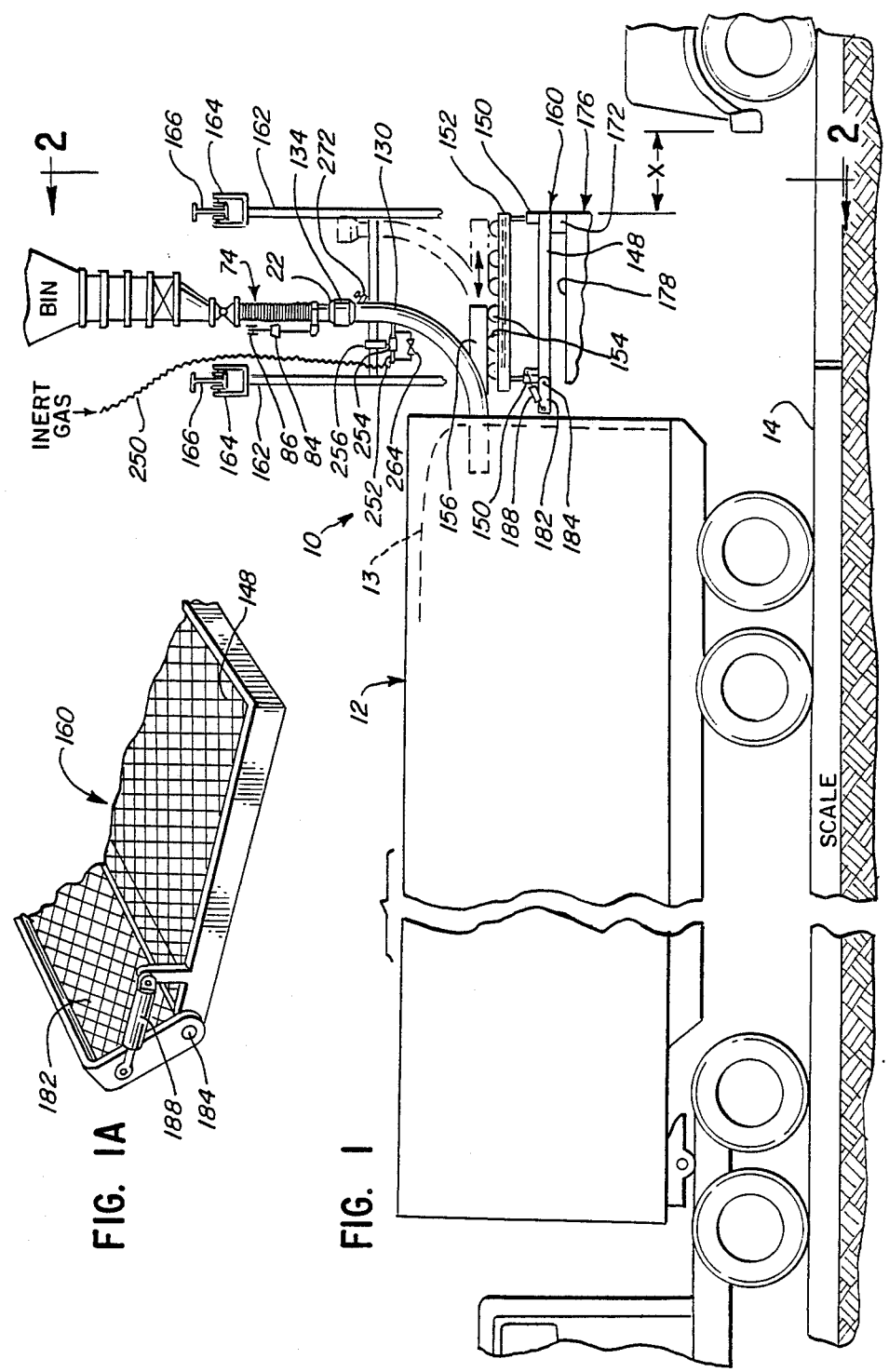
FIG. 1 is a simplified, fragmentary, side view, partially in diagrammatic form, of parts of the bulk-loading system according to the present invention with a truck to be loaded shown in position at the loading station.
FIG. 1A is a partial three-dimensional view of a movable platform having a pivotable floor and being capable of supporting a discharge spout and an exhaust spout.
Figure 3:
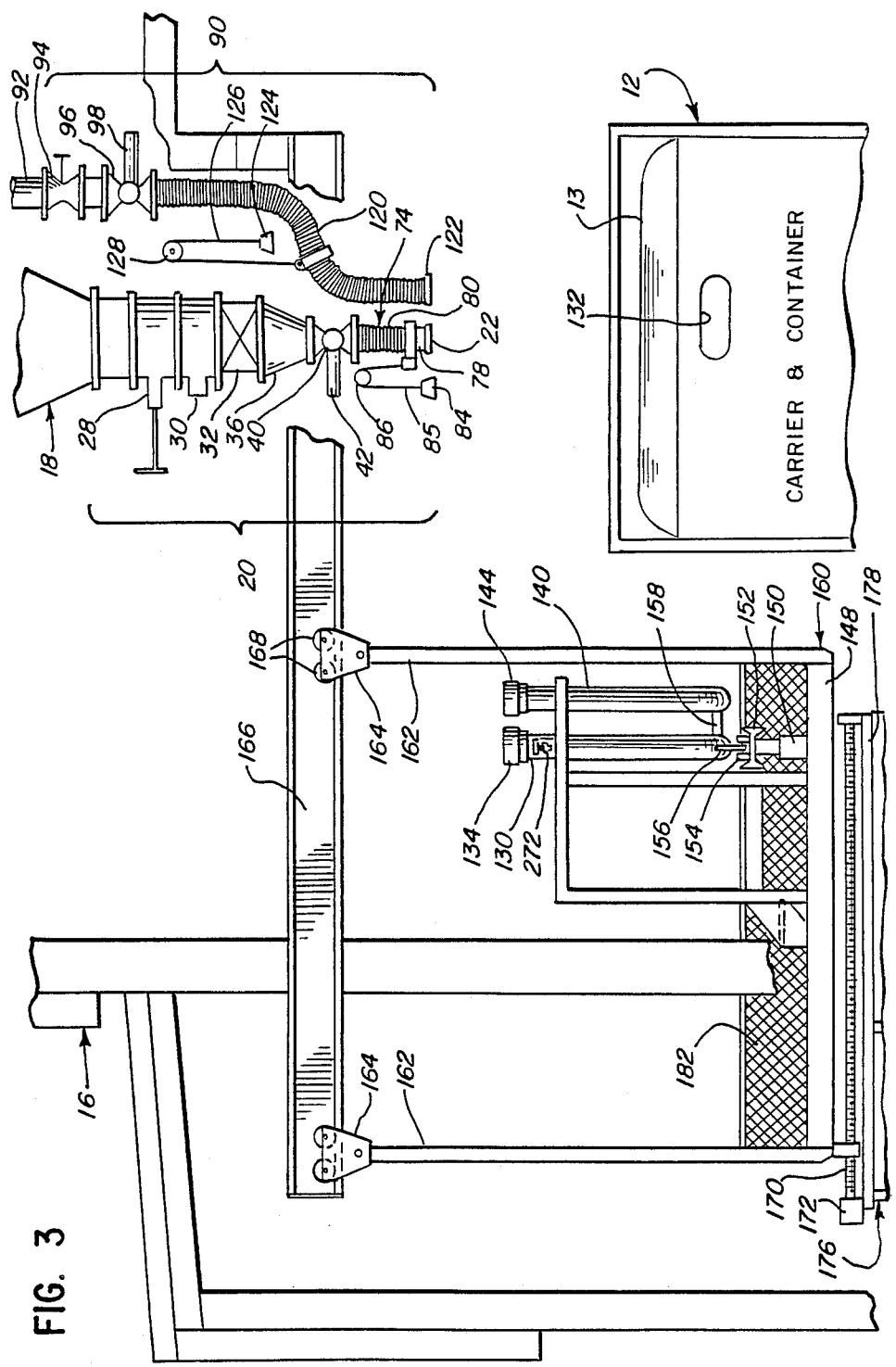
FIG. 3 is a greatly enlarged, fragmentary view similar to FIG. 2.

Referring now to the drawings, the general arrangement of the bulk-loading system apparatus can best be understood with reference to FIGS. 1–3. A container loading station 10 is provided for receiving a container which may be mounted on a truck or other cargo carrier or conveyance 12 or which is otherwise movable through the station 10. The preferred form of the container is illustrated as a flexible, polyethylene envelope liner or bag 13 (FIG. 1) inside the carrier or truck 12.

The station 10 is preferably of the "pass-through" type for receiving a plurality of containers seriatim in a unidirectional progression through the station with intermittent stops for loading each container in a stationary position. Preferably, a grade-mounted scale 14 is provided in the loading station 10, and each container carrier or truck 12 is positioned on the scale during loading.

The loading station 10 may include, and/or be surrounded or defined by, a suitable structural frame 16 (partially shown only in FIGS. 2 and 3). The frame 16 supports a storage silo or storage bin 18 that contains the bulk fluent material. The material may be a powder, flowable comminuted solids, or the like.

A discharge conduit 20 is connected at one end to the bottom of the storage bin 18 and has a quick connect outlet 22 (FIG. 3) at the other end for connection to a discharge spout which is described in detail hereinafter.

In the preferred embodiment, the discharge conduit 20 includes an automatic knife gate shut-off valve 28. Downstream of the valve 28 is a foreign material catcher that includes (1) a pipe tee 30 which has the branch outlet plugged and (2) a wire mesh screen 32. The screen 32 is mounted between the downstream outlet flange of the pipe tee 30 and the upstream flange of a transition piece reducer 36. A blind flange in the branch of the tee 30 can be removed to permit access to the top of the screen 32 for removing foreign material retained thereon. Although not illustrated, a magnetic strip may also be employed for removal of magnetic foreign material.

The outlet of the reducer 36 is connected to a valve 40 which controls flow of the material from the bin 18 through the conduit 20. The discharge valve 40 is of a type that can be closed relatively quickly since high flow rates are typically involved. The type of valve depends, of course, upon the type of material being loaded. Generally, it is contemplated that a knife gate valve would be used for flowable powder or particulate material. A ball valve might be used for other types of material.

As illustrated in the instrumentation and control diagram FIG. 4A, the valve 40 is provided with a pneumatic cylinder operator 42 which is spring biased to close the valve 40. The force of the closure spring is overcome to open the valve 40 by air provided through line 44 from the instrument air supply. The instrument air is supplied for full open actuation of the valve 40 through a line 46. The line 46 can be pressurized by opening an electrically operated solenoid valve 48 controlled by a suitable hand switch 50. Preferably, however, for automatic flow control, instrument air is provided to the pneumatic operator 42 of valve 40 sequentially through three electrically operated solenoid valves 51, 52, and 53 controlled from a control system controller 60 described in more detail hereinafter.

Self-regulated instrument air pressure control valves 61, 62, and 63 supply the instrument air through the electrically operated solenoid valves 51, 52, and 53, respectively. In one preferred mode of operation, the valve 61 is set to deliver maximum instrument air pressure to hold the valve 40 at the full open position (100% flow rate), valve 62 is set to deliver a pressure only sufficient to open the valve 40 to provide a flow rate of about only 70% of the maximum valve flow rate, and valve 63 is set to provide an instrument air pressure only sufficient to open the valve 40 to provide a flow rate of about only 35% of the maximum valve flow rate.

The electrically operated solenoid valves 51, 52, and 53 are operated from the controller 60 in a manner described in more detail hereinafter to selectively supply the operator 42 of valve 40 with operating air pressure from one of the three self-regulating valves 61, 62, and 63.

An isolation valve 66 is provided in the line 44 connected to the operator 42 for permitting maintenance of the operator 42. A position indicator switch 68 and light 70 are provided on the valve 40 to indicate the position of the valve stem.

The discharge conduit 20 also includes a bellows assembly 74 (FIG. 4A) which has an inner, smaller diameter pipe 76 telescopingly received in a larger diameter pipe 78. A dust-tight fabric bellows 80 is sealed at one end around the circumference of the pipe 76 and at the other end around the circumference of the pipe 78.

The bellows assembly 74 is counterweighted to retract the pipe 78 upwardly (to the position shown in FIG. 3) to provide clearance for the carrier or truck 12 as it is moved into position in the loading station 10. The counterweighting of the bellows assembly 74 is schematically illustrated in FIG. 3 as including a counterweight 84 connected via a cable 85 over a pulley 86 to the lower pipe 78. Other suitable counterweight structures or spring devices may be employed. The detailed design and specific structure of the counterweight apparatus described herein forms no part of the present invention.

As best illustrated in FIGS. 2 and 3, an exhaust conduit 90 is provided adjacent the discharge conduit 20. The exhaust conduit 90 is connected through a pipe 92 to a conventional dust collection system (not illustrated) which includes means for effecting flow through the exhaust conduit 90. A hand-operated throttling flapper valve 94 is provided in the conduit 90 along with a valve 96 having a pneumatic operator 98 for actuating the valve 96 between the full open and full closed positions. The valve 96 is also provided with a position switch 116 and associated position indicator light 118 to show the position of the valve stem. (Position switch 116 and indicator light 118 are shown in FIG. 4A). Valve 94 is preferably positioned so as to be accessible from platform 160.

The operator 98 is normally spring-biased to close the valve 96 and is supplied with instrument air, as best illustrated in FIG. 4A, through a line 100 to open the valve. The air is supplied through an electrically operated solenoid valve 102 controlled by the controller 60 of the control system for operation in a manner described in detail hereinafter.

The operator 98 may also be actuated independently of the control system via an electrically operated solenoid valve 106 which, when maintained in one energized position, supplies instrument air to the operator 98 through the line 100. The valve 106 may be actuated with a hand switch 108 from a movable platform 160 (illustrated on FIGS. 1–3 and 4B and described in more detail hereinafter) or from another hand switch 112 at a selected remote location, such as adjacent the truck 12 at grade.

An isolation valve 114 is provided between the operator 98 and the valve 106 for maintenance purposes.

The exhaust conduit 90 includes, below the valve 96, a hand flapper valve 94, a flexible hose portion 120 which has a quick connect inlet 122. The flexible hose portion 120 is counterweighted so that the inlet 122 is normally automatically elevated to accommodate passage of the truck or carrier 12 into the loading station. The counterweighting of the hose portion 120 is schematically illustrated in FIG. 3 as comprising a weight 124 which is secured to the hose portion 120 with a cable 126 trained over a pulley 128. Other suitable counterweight structures or spring devices may be employed. The detailed design and specific structure of the counterweight apparatus described herein forms no part of the present invention.

As best illustrated in FIGS. 1 and 3, a bin discharge spout 130 is provided on the platform 160 for directing the material into the container 13 on the carrier 12. The carrier 12 and container 13 are typically provided with an elongated opening 132 (FIG. 3) for receiving the outlet end of the discharge spout 130. The inlet end of the discharge spout 130 is adapted to be attached via a conventional quick connect coupling 134 to the discharge conduit outlet 22 when the discharge conduit bellows assembly 74 is extended downwardly (FIG. 2). The discharge spout 130, together with the discharge conduit 20, may be characterized as a material discharge transfer means communicating with storage bin 18 for directing flow of the material to the container.

As best illustrated in FIG. 3, an exhaust spout 140 is provided adjacent the discharge spout 130. The exhaust spout 140 has an inlet for communicating with the container opening 132 and an outlet for being releasably connected via a conventional quick connect coupling 144 (FIG. 2) to the inlet 122 of the exhaust conduit hose 120 when the exhaust conduit hose 120 is pulled downwardly.

Similarly, the exhaust spout 140, together with the exhaust conduit 90, may be characterized as an exhaust transfer means for communicating with the container 13 and effecting an exhaust flow of container atmosphere (e.g., including dust) from the container 13.

As best illustrated in FIGS. 1 and 3, the spouts 130 and 140 are supported for movement on the movable platform 160. The platform 160 includes a floor 148, support posts 150 projecting up from the floor 148, and a flanged beam 152 horizontally disposed on the posts 150. The beam 152 receive rollers 154 mounted for rotation on a pipe 156 which is attached to the discharge spout 130. The exhaust spout 140 is suitably mounted to the discharge spout 130 by means of a cross-member 158 (FIG. 3). The discharge spout 130 and exhaust spout 140 are thus movable together as a unit back and forth on the beam 152 toward and away from the container 13.

In FIG. 1, the spouts 130 and 140 are represented by spout 130, since spout 140 is located behind spout 130 and, therefore, is not visible. In FIG. 1, spout 130 is illustrated in solid lines in the extended position communicating with the container interior (through the opening 132 which is visible only in FIG. 3). In the extended position illustrated in FIGS. 1 and 2, the spouts 130 and 140 can be connected to the discharge conduit 20 and exhaust conduit 90, respectively.

The retracted position of the spouts 130 and 140 (represented by spout 130) is illustrated in FIG. 1 in dashed lines. The spouts are movable on the carriage wheels 154 along the beam 152 rearwardly to the retracted position to disengage the spouts from the container 13 after the quick-connect couplings 134 and 144 (FIG. 2) have been disconnected.

The entire platform 160 which carries the spouts 130 and 140 is movable transversely of the carrier 12 between a retracted position as illustrated in FIG. 3 and an extended loading position behind the carrier 12 as illustrated in FIG. 2. To this end, the platform 160 includes four hanger posts 162 which are each connected at an upper end to a trolley 164 and at a lower end to the platform floor 148. Each trolley 164 is mounted on one of two flanged cross beams 166 which straddle the discharge conduit 20 and exhaust conduit 90 as illustrated in FIGS. 1 and 3.

Each trolley 164 includes a pair of wheels 168 on each side of the associated beam 166 to enable the trolley 164 to roll along the beam 166. Each trolley 164 is of conventional design, and the details of the design form no part of the present invention. If desired, other suitable movable structures could be provided for supporting the platform floor 148 at the desired elevation in a manner that would accommodate movement between the extended and retracted positions.

The platform 160 is automatically moved between the retracted position illustrated in FIG. 3 and the extended position illustrated in FIG. 2 on the beams 166 by means of a suitable drive system, such as a ball screw drive 170, an associated reversible electric motor 172, and suitable clutch and brake systems (not illustrated).

The ball screw drive 170 and motor 172 are supported on a fixed lower platform 176 as best illustrated in FIGS. 2 and 3. The fixed lower platform 176 includes an elevated floor 178, an access stair 180, and associated structural support members (not illustrated).

The ball screw drive 170 and the motor 172, along with the clutch and brake systems, are of conventional design well-known to those of ordinary skill in the art. The details of such structures, components, and apparatus form no part of the present invention.

When the movable platform 160 has been moved to the extended loading position behind the carrier 12 as illustrated in FIG. 2, the platform 160 can be, in effect, extended closer to the rear of the container to be filled. To this end, the movable platform 160 includes a pivotable floor 182 as best illustrated in FIG. 1A and FIG. 1. The floor 182 is pivotally mounted to the front end of the previously described floor 148 by means of one or more hinges 184. A pneumatic actuator 188 is connected between the floor 148 and floor 182 for pivoting the floor 182 between a retracted (raised) position (illustrated in FIG. 1A) and an extended (lowered) position (illustrated in FIG. 1).

When the floor 182 is in the lowered position, it provides additional floor area close to the rear of the truck 12 and container 13. Also, the rear bulkhead of some types of truck containers is typically inset (e.g., up to 8 inches) forwardly of the rear peripheral edges of the carrier. Thus, if the width of the pivotable floor 182 is less than that of the rear bulkhead, the floor 182 can extend into the inset space to permit the operator to get closer to the bulkhead and to eliminate the possibility of the operator falling off of the platform 160 between the bulkhead and the platform.

The operator would typically walk on the platform 182 as well as on the platform 148 when moving the spouts 130 and 140 into loading position and when making the connections between the spouts and the container 13.

The actuator 188 is operated by means of instrument air as best illustrated in FIG. 4B. The actuator 188 is a double-acting piston/cylinder actuator supplied at one end with instrument air through line 190 and supplied at the other end with instrument air through the line 192. The instrument air is fed to the lines 190 and 192 through an electrically operated four-way solenoid valve 194 which is controlled by a local hand switch 196 accessible from the movable platform floor 148.

A proximity or position switch is provided to sense the raised position of the pivotable floor 182. To this end, and with continued reference to FIG. 4B, a position switch 204 is provided for being actuated by the pivotable floor 182 in the raised position.

A position switch 204 is part of the control system circuit. The control system functions, inter alia, to prevent movement of the platform 160 by the motor 172 to the extended loading position (as shown in FIG. 2) unless the limit switch 204 has been actuated by the pivotable floor 182 in the raised position.

"Forward" and "reverse" button switches (not illustrated) are provided on the platform 160 for controlling the direction of rotation of the motor 172 to extend or retract the platform 160. However, a hand selector switch 210 (FIG. 4B) is also provided on the movable platform 160, and the switch 210 must be held in the "on" position to run the motor 172 in either direction. The motor 172 will stop if the switch 210 is released at any point during the movement of the platform 160 between the fully extended and fully retracted positions. When the platform 160 reaches the fully extended position it actuates a proximity switch 212 which, through the control system, deenergizes the motor 172 and actuates the brake.

Movement of the platform 160 to the extended loading position (as illustrated in FIG. 2) is also prevented by certain other interlocks in the control system unless certain permissive conditions are satisfied. In particular, the platform 160 cannot be extended unless the platform 160 is initially located in the fully retractable position as sensed by a proximity switch 214 (FIG. 4B).

Further, movement of the platform 160 to the extended position is not possible unless the discharge spout 130 and exhaust spout 140 are in the fully retracted position. To this end, a proximity or position switch 216 (FIG. 4A) is provided behind the crossmember 158 for being actuated when the spouts are moved to their rearwardmost position. Switch 216 is connected into the control system for preventing actuation of the motor 172 to extend the platform 160 unless the switch has been actuated in response to the movement of the spouts 130 and 140 to the rearwardmost position.

Additionally, the control system prevents operation of the motor 172 to extend the platform 160 unless a container 13 has been first properly positioned in the loading station on the scale 14. To this end, and with continued reference to FIG. 4B, three photoelectric switches 220, 222, and 224 are provided to be actuated by the interruption of the associated light sources across the path leading to the scale 14 in the loading station.

The photoelectric sensors of the switches 220, 222, and 224 are preferably mounted on appropriate framework (not illustrated) on the stationary platform 176 adjacent the path leading to the scale 14. The sensor of the photoelectric switch 220 is located furthest from the scale 14 so that the light directed to that sensor is first interrupted by the leading edge of the truck 12 carrying the container 13 as the truck approaches the scale 14. The switch 220 operates through the control system to energize a green light 230 which is positioned in the loading station near the front end of the scale so that it is visible by the truck driver as the truck moves onto the scale 14.

The sensor of the photoelectric switch 222 is positioned a short distance behind the final stopping position of the rear end of the truck 12 (e.g., about one foot). The control system operates in response to the switch 222 to energize a yellow light 232 which is located adjacent the green light 230 for observation by the truck driver as the truck approaches its final loading position on the scale 14. The control system functions in such a way that the yellow light 232 is not energized when the light to the switch 222 is initially interrupted by the truck. Rather, only after the rear end of the truck 12 has cleared the light to the switch 222 does the control system permit the corresponding actuation of the switch 222 to effect energization of the yellow light 232.

Finally, the sensor for the photoelectric switch 224 is located at the desired stopping position of the rear end of the truck 12. The switch 224 and control system function to energize a red light 234. The red light 234 is positioned adjacent the yellow light 232 and green light 230 in the loading station for observation by the truck driver as the truck approaches the forwardmost point on the scale 14 corresponding to the proper loading position of the truck. However, as with the yellow light 232, the red light 234 is not energized when the truck interrupts the light source to the switch as the truck moves forward on the scale 14. Rather, only after the rear end of the truck 12 has cleared the light to the switch 224 does the resulting actuation of the switch 224 energize the red light 234.

In operation, the truck driver slowly approaches the loading station and begins to drive onto the scale 14. Actuation of the switch 220 as a result of the interruption of the light source by the front of the truck energizes the green light 230. This indicates to the truck driver that he should proceed slowly onto the scale 14. When the back of the truck clears the light source directed to the sensor of the photoelectric switch 222, the yellow light 232 is energized. This indicates that the truck driver should proceed very slowly, and that the red "stop" light 234 will be energized very soon. When the red light 234 is subsequently energized, the truck is immediately stopped at the proper loading position on the scale 14. The three lights 230, 232, and 234 are controlled by a timer in the control system to remain energized for 10 seconds and are deenergized after that.

The control system provides an interlock with the electrical circuit for the red light 234 such that the red light 234 must have been energized in order for the movable platform 160 to be moved from its retracted position to its extended position. This prevents the platform 160 from moving outwardly into the path of the truck until the truck has moved beyond the extension region of the platform 160 and has been properly located in the loading position on the scale 14.

The scale 14 is provided with a digital indicator and transmitter unit 240 (FIG. 4B) which is located on a suitable control panel (not illustrated) on the movable platform 160. The indicator and transmitter unit 240 provides a direct readout of the weight on the scale 14 and transmits the value to a programmable controller 60 which sends a signal to a printer 242. A suitable conventional program control is provided so that an initial (empty) truck weight is sensed and later subtracted from the final loaded truck weight to provide a net weight which can be obtained by pressing a print button on the scale digital indicator. A total weight can also be printed.

As best illustrated in FIGS. 1 and 4A, inert gas is supplied to the discharge spout 130 through a flexible hose supply line 250 which is connected through a short rigid pipe 252 with the spout 130. A pneumatically operated gas control valve 254 is provided in the pipe 252 for controlling the flow of inert gas (e.g., nitrogen) to the discharge spout 130. An appropriate manual by-pass valve 264 is provided in parallel with the control valve 254.

The control valve 254 includes a pneumatic piston/cylinder operator 256 which is normally spring-biased to maintain the valve 254 in the closed position and which is operable to open the valve 254 by means of instrument air supplied through an instrument air line 258 from a three-way electrically operated solenoid valve 260. The solenoid valve 260 is actuated by the control system at appropriate times during the bulk loading operation as described in more detail hereinunder.

Also connected with the discharge spout 130 is a sample line 270 which is provided with a normally closed, manual, shut-off valve 272. The material being loaded into the container 13 may be sampled through this line during the loading operation.

OPERATION AND CONTROL OF THE BULK LOADING SYSTEM

A container 13 that is to be loaded is positioned in the loading station 10. With a truck-mounted container 13, the truck 12 is driven onto the scale 14 and stopped when the red light 234 is energized by the control system in the manner described in detail above.

A following truck could pull up to a predetermined point marked by a suitable sign, gate, or other device, and that predetermined point would provide a sufficient minimum clearance distance X between the front of the following truck and the movable platform 160.

To accommodate the movement of the truck 12 into position in the loading station 10, the movable platform 160 is necessarily initially maintained in the fully retracted position. This is sensed by the switch 214 (FIG. 4B). Also, the pivotable floor 182 is initially in the raised position (illustrated in dashed lines in FIG. 4B), and this is sensed by the switch 204. Further, the spouts 130 and 140 are in the rearwardmost position (illustrated in dashed lines in FIG. 1), and this is sensed by the switch 216 (FIG. 4A).

With the switches 204, 214, and 216 sensing initial, fully retracted, positions of the components, and with the red light 234 having been actuated, the control system permits the movable platform to be extended as illustrated in FIG. 2. To this end, the operator stands on the platform 160 and operates the controls from a panel on the platform 160.

The forward button for the motor 172 is then depressed, and the selector hand switch 210 is turned and maintained in the "on" position as the platform moves to the fully extended position. In the fully extended position, the proximity switch 212 is actuated, and the control system turns off the motor 172 and sets the brake.

Next, the operator lowers the pivotal platform 182 by actuating the hand switch 196 to extend the pneumatic piston/cylinder operator 188. The operator then connects a grounding strap (not illustrated) between the platform 160 and the truck.

The operator next moves the discharge spout 130 and exhaust spout 140 forwardly on the beam 152 to insert the spouts into the container opening 132. The container 13 may include an attached, conventional inlet spout structure (not illustrated). The inlet spout structure of the container 13 can be secured around both the discharge spout 130 and exhaust spout 140 with a conventional tie strap that may employ a two-piece fastener sold under the trademark VELCRO or other suitable fastener.

Next, the operator connects the discharge spout quick-connect coupling 134 to the discharge conduit outlet 22 and connects the exhaust spout quick-connect coupling 144 to the exhaust conduit inlet 122.

During the equipment positioning and connecting procedures so far described, and during subsequent loading operations, the operator is able to quickly exit the loading station area if the need arises. Since the end of the extended platform 160 overlies the end of the fixed platform 176, the operator can step from the movable platform 160 to the fixed platform 176 and then descend the stair 180.

In the preferred form of semiautomatic operation of the system the operator first makes sure that the control system is initialized to proper initial values (e.g., typically by actuating a "program reset" switch associated with the controller 60). The operator next enters a desired final weight into the programmable controller 60 (e.g., typically via a key pad).

Additionally, a special selector switch (not illustrated) is provided for selecting the size of the container that is to be loaded. In one embodiment, the selector switch has two positions, one position corresponding to a conventional 20 foot long truck-mounted container and another position corresponding to a conventional 40 foot long truck-mounted container. The container selector switch sets the control system to operate the various control valves as necessary to provide inflation of the container 13 and to provide level product filling of the container.

A start button (not illustrated) is actuated to begin the loading process by activating the programmable controller 60. The control system opens the gas control valve 254 for a predetermined time period (based upon the selector switch setting for the particular size container being filled). The container 13 is inflated to facilitate filling and to prevent damage to the liner during loading.

The container 13 is typically inflated with an inert gas, such as nitrogen. After the inflation time period has elapsed, the control system effects closure of the gas control valve 254 by deenergizing the solenoid valve 260 to block the instrument air supply to the valve operator 256 and permit the pneumatic cylinder/piston operator to exhaust through the exhaust port of the solenoid valve 260.

The control system then automatically effects the opening of the exhaust valve 96 by energizing the solenoid valve 102 to supply instrument air for pressurizing the valve pneumatic cylinder/piston operator 98.

At the same time the exhaust valve 96 opens, the discharge valve 40 is automatically opened. Initially, the discharge valve 40 is opened to 100% of its full wide open position. To this end, the control system energizes the solenoid valve 51 to supply instrument air to the valve pneumatic cylinder/piston operator 42. The self-regulated control valve 61 upstream of the solenoid valve 51 provides air at a pressure sufficiently high to maintain the valve 40 in the full open position. At this time, the electrically operated solenoid valves 52 and 53, which are parallel to the electrically operated solenoid valve 51, are each in a position to block the supply of instrument air through them to the valve operator 42.

When a conventional 20 foot container is being loaded, the container may be completely loaded through the valve 40 in the full open position. However, with longer containers, such as with the standard 40 foot container, it is desirable to provide a means for decreasing the flow rate of the material into the container as a function of time prior to completely terminating the flow. This provides for a more uniform distribution of the material in the longer container. To this end, the control system is programmed to automatically control the discharge valve 40 as necessary to decrease the rate of flow of the material into such longer containers as a function of time.

Specifically, after a predetermined time period, the valve 40 is adjusted to provide a flow rate of only about 70% of the maximum wide open flow rate. To this end, the control system deenergizes the solenoid valve 51 to block instrument air to the operator 42 and energizes the solenoid valve 52 to supply instrument air to the operator 42. The instrument air is supplied through the self-regulating pressure reducing valve 62 at a reduced pressure which results in the operator 42 maintaining the valve 40 with a reduced flow rate of about 70% of the maximum wide open flow rate.

After another predetermined period of time, the control system deenergizes the solenoid valve 52 to block the air supply to the operator 42, and energizes the solenoid valve 53 to pressurize the operator 42 with instrument air flowing through the self-regulating pressure reducing valve 63. The valve 63 provides a further reduction in the air pressure which results in the operator 42 maintaining the valve 40 at a position which limits the material flow rate to about 35% of the maximum wide open flow rate.

During the filling process, the by-pass valve 264 may be manually opened. This will affect product distribution in the container. Such a procedure might be necessary to achieve a more level distribution with some types of material depending upon the size and shape of the container.

Also, during the filling process, a product sample may be taken by opening the valve 272 on the discharge spout 130.

During the filling process, the controller 60 is receiving the signal from the scale transmitter unit 240. When the signal received by the controller 60 corresponds to the set target weight, the control system simultaneously closes the discharge valve 40 and the exhaust valve 96. This is done by deenergizing the discharge valve operator solenoid valve 51 (when loading a 20 foot container) or solenoid valve 53 (when loading a 40 foot container) and by deenergizing the exhaust valve solenoid valve 102.

After the discharge valve 40 and exhaust valve 96 have been automatically closed by the control system, the control system then opens the inert gas supply valve 254 for a predetermined short time period to clear the material out of the discharge spout 130. The valve 254 is automatically closed after the short clean-out period.

The operator may then print out the indicated weight on the printer 242 by pressing a "program stop" button. Also, pressing of the print button on the scale digital indicator will print out the net weight.

The quick-connect couplings 134 and 144 may then be disconnected so as to separate the discharge spout 130 from the discharge conduit 20 and so as to separate the exhaust spout 140 from the exhaust conduit 90. Then the spouts can be disconnected from the integral spout structure of the container 13 in the truck.

The grounding strap can then be disconnected, and the spouts can be retracted from the container 13 and pushed to the fully retracted position on the movable platform 160 (as indicated in dashed lines in FIG. 1). When the spouts are in the fully retracted position on the platform 160, the proximity switch 216 (FIG. 4A) is actuated. Until it is actuated, the movable platform 160 cannot be retracted from behind the container 13 and truck 12.

The operator then actuates the hand switch 196 to raise the pivotable floor 182 on the platform 160. In the raised position, the floor 182 actuates the switch 204. The movable platform 160 cannot be retracted from behind the container 13 unless switch 204 has been actuated.

The platform 160 is then retracted by the operator who depresses the reverse button (not illustrated) and holds the permissive selector switch 210 in the "on" position. When the platform 160 reaches the fully retracted position (FIG. 3), the proximity switch 214 (FIG. 4B) is actuated, and the control system automatically turns off the motor 172 and sets the brake.

During movement of the platform 160 to the fully retracted position, the operator must continue to hold the selector switch 210 in the "on" position. If he releases the switch 210, the platform 160 will stop.

As an additional safety feature, an emergency "program stop" button (not illustrated) is provided on the platform 160. Actuation of the emergency stop button will turn off the motor 172 and terminate further movement of the platform 160 (regardless of whether the platform is being retracted or extended).

As a further safety feature, the loading operation can be stopped at any time by pressing a "loading stop" button on the control panel on the platform 160. This will cause the control system to automatically fully close the discharge valve 40 and the exhaust valve 96. In addition, the discharge valve 40 and exhaust valve 96 may be closed by the separate hand switches 50 (FIG. 4A) and 108 (FIG. 4A), respectively.

It is also possible to load the container in a fully manual mode. This can be effected by operating the discharge valve 40 through its local hand switch 50 and by operating the exhaust valve 96 through its local hand switch 108.

Also, a key lock is provided in an override system in the control system to allow operation without the above described safety interlocks. Of course, caution should be exercised when operating the system and such a mode.

It is seen that the novel system of the present invention accommodates bulk loading of a container by one man. The loading station accommodates pass-through container transport and accommodates precise positioning of the container in the loading station.

In the preferred embodiment, the discharge and exhaust conduits are vertically adjustable to accommodate passage of the container into the loading station. Additionally, the loading and exhaust spouts are movable to permit insertion into the container and to accommodate different size containers. Further, automatic positioning of the spout support platform is provided.

The positioning of the platform can be effected rapidly and precisely in the preferred form of the invention wherein a ball screw drive system is employed.

The container can be automatically loaded to a predetermined weight, and the material distribution in the container can be controlled automatically by controlling the flow of the material into the container. The system also operates to provide a relatively even load distribution in different size containers.

With this system, it has been found that substantially reduced loading times, as compared to conventional bulk loading systems, have been achieved ranging from six to ten minutes for conventional, rear-entry bag-type containers.

Since the container can be loaded by the operator standing on the movable platform, the operator at all times can have an unobstructed view of the loading operation. This fact, coupled with the various emergency and nonemergency control switches provided on the movable platform, results in a system having a high degree of reliability and safety.

Since gravity flow is employed in the bulk loading system, the system is relatively inexpensive to operate. Repetitive operation involving a large number of containers is relatively quickly and easily accommodated.

MODIFICATIONS AND ALTERNATIVE PROCEDURES

The bulk loading system of the invention has been described for use with free flowing material located in an overhead storage bin. It is contemplated that the system may be employed with a variety of materials, including, but not limited to, bulk grain, bulk plastic materials, and bulk food materials.

Although the system has been illustrated for a preferred embodiment that permits one-man operation with an overhead storage bin at a drive-through station for rear opening containers, it is contemplated that the system may also be adapted for use with top-entry containers.

In the preferred embodiment illustrated, the discharge spout 130 and exhaust spout 140 are mounted in side-by-side relationship. It is contemplated, however, that alternative mounting arrangements could be used. For example, the discharge spout could be mounted concentrically within the exhaust spout. This would provide a single round penetration.

The length of the discharge spout 130 that extends into the container to be filled may be selected depending upon the length and cross-sectional configuration of the container to be filled and depending upon the type of material being introduced into the container. The projection distance of the discharge spout 130 in the container can affect the distribution of the material that is loaded into the container.

Although the preferred embodiment of the system has been illustrated as employing a movable platform 160, it is contemplated that the novel automatic loading process can be easily adapted for use with a modified system wherein a movable platform is not required.

EXAMPLE OF AUTOMATIC CONTROL PROGRAM

In the preferred embodiment of the system that has been described, a suitable programmable controller that may be used is a controller sold under the trademark SY/MAX Model 300 by Square D Company, P.O. Box 472, Milwaukee, Wis., U.S.A. 53201-0472. An example of a ladder program used with this type of programmable controller is set forth below and forms a part of this specification. A legend and explanatory examples for the program are first set forth immediately below, and the program, per se, follows.

PROGRAM LEGEND FOR PROGRAM

| Symbol | Description |
|---|---|
| ─] [─ | Normally open contact |
| ─]/[─ | Normally closed contact |
| ─( )─ | Relay coil |
| ─(⁰⁰⁰¹₋₁₆)─ | 0001-16 specifies a coil address |
| ⁰⁰¹¹ ─] [─ | 0011 references the rung number a where normally open contract would appear |
| ─(L)─ | Latching relay |
| ─(U)─ | Unlatch a latching relay |
| ┌─ ─ ─ ─ ─ ─ ─┐<br>│IF S0020 > 0021│<br>└─ ─ ─ ─ ─ ─ ─┘ | If register 20 is greater than 21, then energize |
| ┌─ TMR ─┐<br>│  TIME  │<br>│ S0022  │<br>│ CLEAR  │<br>│  .1S   │<br>│ =0100  │<br>│   0017 │<br>│─( )─  │<br>│   06   │<br>└────────┘ | Timer whose address is S0022 and which times out in 0.1 second increments to energize a coil 17-06 when the time period value of 10.0 seconds is obtained |

PROGRAM

```
RUNG0001
!
!GREEN
!PHOTO                                                                          GREEN
!CELL                                                                           PHOTO
! 0001                                                                          COIL
+--] [-+-------+-------+-------+-------+-------+-------+-------+-------+------+ 0011
!  -08                                                                       +--( )-
                                                                                -01
CROSS REFERENCE

I/00011-01      GREEN PHOTO COIL
0001-( )-       0004-] [-       0007-] [-

RUNG0002
!
!YELLOW LIGHT
!PHOTO   TIME                                                                   YELLOW
!CELL    DELAY                                                                  PHOTO
! 0001   0017                                                                   COIL
+--] [-+--]/[-+-------+-------+-------+-------+-------+-------+-------+-------+ 0011
!  -07    -02                                                                +--( )-
                                                                                -02
CROSS REFERENCE

I/00011-02      YELLOWPHOTO COIL
0002-( )-       0005-] [-

RUNG0003
!
!RED
!PHOTO                                                                          RED
!CELL                                                                           PHOTO
! 0001                                                                          COIL
+--] [-+-------+-------+-------+-------+-------+-------+-------+-------+------+ 0011
!  -06                                                                       +--( )-
                                                                                -03
CROSS REFERENCE

I/00011-03      RED   PHOTO COIL
0003-( )-       0006-] [-       0008-] [-

RUNG0004
!
!GREEN   LIGHT
!PHOTO   TIME
!COIL    DELAY                                                                  GREEN
! 0011   0017                                                                   LIGHT
+--] [-+--]/[-+-------+-------+-------+-------+-------+-------+-------+-------+ 0001
!  -01    -02                                                                +--( )-
                                                                                -16
CROSS REFERENCE
```

© COPYRIGHT 1987 Amoco Corporation

```
I/00001-16      GREEN LIGHT
0004-( )-

RUNG0005
!
!YELLOW LIGHT
!PHOTO   TIME
!COIL    DELAY                                                                  YELLOW
! 0011   0017                                                                   LIGHT
+--] [-+--]/[-+-------+-------+-------+-------+-------+-------+-------+-------+ 0001
!  -02    -02                                                                +--( )-
                                                                                -15
CROSS REFERENCE

I/00001-15      YELLOWLIGHT
0005-( )-
```

```
RUNG0006
!
!RED      LIGHT
!PHOTO    TIME                                                                              RED
!COIL     DELAY                                                                             LIGHT
! 0011    0017                                                                              0001
+--] [-+--]/[-+--------+--------+--------+--------+--------+--------+--------+--------+---( )-
!  -03    -02                                                                               -14

CROSS REFERENCE

I/O0001-14   RED   LIGHT
0006-( )-

RUNG0007
                                                                                        +-TMR--+
+--------+--------+--------+--------+--------+--------+--------+--------+--------+------+!TIME !
!                                                                                        !     !
!                                                                                        !     !
+    +    +    +    +    +    +    +    +    +    +                                     +!S0025!
!                                                                                        !     !
!GREEN                                                                                   !     !
!PHOTO                                                                                   !     !
!COIL                                                                                    !     !
! 0011                                                                                   !     !
+--] [--+--------+--------+--------+--------+--------+--------+--------+--------+--------+!CLEAR!
!  -01                                                                                   !     !
!                                                                                        !     !
+    +    +    +    +    +    +    +    +    +    +                                     +! .1S !
!                                                                                        !     !
!                                                                                        !     !
+    +    +    +    +    +    +    +    +    +    +                                     +!     !
!                                                                                        !     !
!                                                                                        !     !
+    +    +    +    +    +    +    +    +    +    +                                     +!=0100!
!                                                                                        !     !
!                                                                                        !LIGHT!
!                                                                                        !TIME !
!                                                                                        !DELAY!
!                                                                                        ! 0017!
+    +    +    +    +    +    +    +    +    +    +                                     +!--( )-!
                                                                                         +---01-+

CROSS REFERENCE

S0025
0007 TMR

I/O0017-01   LIGHT TIME DELAY
0007 TMR

RUNG0008
                                                                                        +-TMR--+
+--------+--------+--------+--------+--------+--------+--------+--------+--------+------+!TIME !
!                                                                                        !     !
!                                                                                        !LIGHT!
!                                                                                        !TIME !
!                                                                                        !DELAY!
+    +    +    +    +    +    +    +    +    +    +                                     +!S0018!
!                                                                                        !     !
!RED                                                                                     !     !
!PHOTO                                                                                   !     !
!COIL                                                                                    !     !
! 0011                                                                                   !     !
+--] [--+--------+--------+--------+--------+--------+--------+--------+--------+--------+!CLEAR!
!  -03                                                                                   !     !
!                                                                                        !     !
+    +    +    +    +    +    +    +    +    +    +                                     +! .1S !
```

```
    !                                                                          !      !
    +     +     +     +     +     +     +     +     +     +!            !      !
    !                                                                   !      !
    +     +     +     +     +     +     +     +     +     +!-0100       !      !
    !                                                                   !      !
    !                                                      !LIGHT       !
    !                                                      !TIME        !
    !                                                      !DELAY       !
    !                                                      ! 0017       !
    +     +     +     +     +     +     +     +     +     +!--( )-!
    !                                                      +---02-+

CROSS REFERENCE

S0018     LIGHT TIME DELAY
0008 TMR

I/00017-02    LIGHT TIME DELAY
0002-]/[-         0004-]/[-       0005-]/[-        0006-]/[-       0008 TMR

0018-]/[-
```

```
RUNG0009
 !
 !START                                                                           START
 !P.B.                                                                            COIL
 ! 0001                                                                           0010
 +--] [-+-------+-------+-------+-------+-------+-------+-------+-------+------+--( )-
 !   -01                                                                          -01

CROSS REFERENCE

I/00010-01    START COIL
0009-( )-      0011-] [-

RUNG0010
 !
 !STOP                                                                            STOP
 !P.B.                                                                            COIL
 ! 0001                                                                           0010
 +--] [-+-------+-------+-------+-------+-------+-------+-------+-------+------+--( )-
 !   -02                                                                          -02

CROSS REFERENCE

I/00010-02    STOP COIL
0010-( )-      0011-]/[-

RUNG0011
 !
 !STOP  START  RESET                                                              START
 !COIL  COIL   RELAY                                                              RELAY
 ! 0010  0010  0009                                                               0009
 +--]/[-+--] [-+--] [-+-------+-------+-------+-------+-------+-------+------+--( )-
 !  -02 !  -01 ! -02                                                              -01
 !      !      !
 !      !START !
 !      !RELAY !
 !      ! 0009 !
 +      +--] [-+    +     +     +     +     +     +     +
 !         -01

CROSS REFERENCE

I/00009-01    START RELAY
0011-] [-        0011-( )-        0016-] [-         0017-] [-        0018-] [-

0022-] [-        0023-] [-        0024-] [-        0030-] [-
```

```
RUNG0012
 !
 !RESET                                                                    RESET
 !P.B.                                                                     RELAY
 ! 0001                                                                    0009
 +--] [-+--------+--------+--------+--------+--------+--------+--------+--(L)-
 !  -03                                                                     -02

CROSS REFERENCE

I/00009-02       RESET RELAY
0011-] [-         0012-(L)-        0013-(U)-

RUNG0013
 !
 !RESET
 !UN-                                                                      RESET
 !LATCH                                                                    RELAY
 ! 0009                                                                    0009
 +--] [-+--------+--------+--------+--------+--------+--------+--------+--(U)-
 !  -04                                                                     -02

CROSS REFERENCE

I/00009-02       RESET RELAY
0011-] [-         0012-(L)-        0013-(U)-

RUNG0014
 !
 !20'                                                                      20'
 !TRUCK                                                                    TRUCK
 !SELECT                                                                   RELAY
 ! 0001                                                                    0010
 +--] [-+--------+--------+--------+--------+--------+--------+--------+--( )-
 !  -04                                                                     -03

CROSS REFERENCE

I/00010-03    20'  TRUCK RELAY
0014-( )-         0017-] [-        0022-] [-

RUNG0015
 !
 !40'                                                                      40'
 !TRUCK                                                                    TRUCK
 !SELECT                                                                   RELAY
 ! 0001                                                                    0010
 +--] [-+--------+--------+--------+--------+--------+--------+--------+--( )-
 !  -05                                                                     -04

CROSS REFERENCE

I/00010-04    40'  TRUCK RELAY
0015-( )-       0016-] [-      0022-] [-     0023-] [-      0030-] [-

RUNG0016
                                                                         +-TMR--+
 +--------+--------+--------+--------+--------+--------+--------+--------+!TIME !
 !                                                                        !      !
 !                                                                        !      !
 !                                                                        !40'TR.!
 !                                                                        !INFL. !
 !                                                                        !TIMER !
 !                                                                        !      !
 +    +    +    +    +    +    +    +    +    +    +                     +!S0019 !
 !                                                                        !      !
 !      40'                                                                !      !
 !START TRUCK                                                              !      !
 !RELAY RELAY                                                              !      !
 ! 0009  0010                                                              !      !
 +--] [-+--] [-+--------+--------+--------+--------+--------+--------+----+!CLEAR !
 !  -01   -04                                                              !      !
 !                                                                        !      !
 +    +    +    +    +    +    +    +    +    +                          +! .1S !
```

```
                                                              +!=0700 !
                                                              !      !
                                                              !40'TR.!
                                                              !INFL. !
                                                              !TMR   !
                                                              ! 0017 !
                                                              +!--( )-!
                                                              +---03-+
```

CROSS REFERENCE

S0019    40'TR.INFL. TIMER
0016 TMR       0018 IF

I/00017-03    40'TR. INFL. TMR
0016 TMR       0018-]/[-     0022-] [-     0023-] [-     0024-] [-

0030-] [-

RUNG0017

```
                                                              +-TMR--+
                                                              !TIME  !
                                                              !      !
                                                              !20'TR.!
                                                              !INFL. !
                                                              !TIMER !
                                                              !      !
                                                              !S0020 !
        20'                                                   !      !
!START  TRUCK                                                 !      !
!RELAY  RELAY                                                 !      !
! 0009  0010                                                  !      !
+--] [-+--] [-+                                              +!CLEAR !
   -01    -03                                                 !      !
                                                              !      !
                                                              !  .19 !
                                                              !      !
                                                              !      !
                                                              !      !
                                                              !=0350 !
                                                              !      !
                                                              !20'TR.!
                                                              !INFL. !
                                                              !TMR   !
                                                              ! 0017 !
                                                              +!--( )-!
                                                              +---04-+
```

CROSS REFERENCE

S0020    20'TR.INFL. TIMER
0017 TMR       0018 IF

I/00017-04    20'TR.INFL. TMR
0017 TMR       0022-] [-

RUNG0018                WILL INFLATE AFTER 3 SEC DELAY

!40'TR.              40'TR.                              IN-
!INFL.  START        INFL.                               FLATE
!TMR    RELAY        TIMER                               AIR

```
! 0017    0009   +--------------------+                                           0001
+--]/[-+--] [-+!IF    S0019 )0030 !+------+------+------+------+------+------+--( )-
! -03 !  -01 !+--------------------+!                                              -09
!      !     !                      !
!LIGHT !     !         20'TR.       !
!TIME  !     !         INFL.        !
!DELAY !     !         TIMER        !
! 0017 !     !+--------------------+!
+--]/[-+     +!IF    S0020 )0030 !+       +      +      +      +      +
!  -02        +--------------------+!
!
!
! 0012                               !
+--] [-+------+------+------+-------+       +      +      +      +      +
!  -05
```

CROSS REFERENCE

```
I/00001-09    IN-   FLATE AIR
0018-( )-
```

RUNG0019
```
!
!
!                                                                          FAST
!          LOAD                    LOAD                                    LOAD
!          TIMER                   TIMER                                   RELAY
!+--------------------+ +--------------------+                             0009
+!IF    S0021 )0021 !+!IF    S0021 (0040 !+------+------+------+------+--( )-
!+--------------------+ +--------------------+                              -07
```

CROSS REFERENCE

```
I/00009-07    FAST LOAD RELAY
0019-( )-     0023-] [-
```

RUNG0020
```
!
!
!                                                                        PRESET
!                                                                        COMPAR
!                                                                        ISON
!+--------------------+                                                   0012
+!IF    S0048 =S0050!+------+------+------+------+------+------+------+--(L)-
!+--------------------+                                                    -01
```

CROSS REFERENCE

```
I/00012-01    PRESETCOMPARISON
0020-(L)-     0021-] [-     0025-(U)-     0031-] [-
```

RUNG0021                         R50 PRESET THOUS.WT. R51 PRESET HUNDR.WT.
```
!
!              PRESET                                                    PRESET
!              COMPAR                                                    COMPAR
!              ISON                                                      ISON
!+--------------------+ 0012                                             0012
+!IF    S0049 )S0051!+--] [-+------+------+------+------+------+------+--(L)-
!+--------------------+  -01                                              -02
```

CROSS REFERENCE

```
I/00012-02    PRESETCOMPARISON
0021-(L)-     0022-]/[-     0023-]/[-     0024-]/[-     0026-(U)-

0028-] [-     0031-] [-
```

RUNG0022                         R48 10 THOUSAND IND WEIGHT, R49 HUNDRED IND WEIGHT
```
!        40'TR.  40'                       PRESET                        PROD.
!START   INFL.   TRUCK           LOAD      COMPAR                        FLOW
!RELAY   TMR     RELAY           TIMER     ISON                          20%
! 0009   0017    0010  +--------------------+ 0012                       0001
+--] [-+--] [-+--] [-+!IF    S0021 (0020 !+--]/[-+------+------+------+--( )-
!  -01 !  -03 !  -04 +--------------------+!  -02                         -10
!      !      !
!      !20'TR.!20'
!      !INFL. !TRUCK
```

```
!       !TMR  !RELAY                          !
!       ! 0017 ! 0010                         !
+      +--] [-+--] [-+------+------+------+   +     +     +     +
!       -04   -03
```

CROSS REFERENCE

```
I/00001-10    PROD. FLOW  20%
0022-( )-     0027-] [-      0031-]/[-     0032-]/[-
```

RUNG0023
```
!
!       40' TR. 40'   FAST.  PRESET                                        PROD.
!START  INFL.  TRUCK  LOAD   COMPAR                                        FLOW
!RELAY  TMR    RELAY  RELAY  ISON                                          10%
! 0009  0017   0010   0009   0012                                          0001
+--] [-+--] [-+--] [-+--] [-+--]/[-+------+------+------+------+------+--( )-
!  -01   -03    -04    -07    -02                                           -11
```

CROSS REFERENCE

```
I/00001-11    PROD. FLOW  10%
0023-( )-     0027-] [-      0031-]/[-     0032-]/[-
```

RUNG0024
```
!
!       40' TR.               PRESET                                       PROD.
!START  INFL.        LOAD     COMPAR                                       FLOW
!RELAY  TMR          TIMER    ISON                                         5%
! 0009  0017   +--------------+  0012                                      0001
+--] [-+--] [-+!IF  S0021 )0041 !+--]/[-+------+------+------+------+--( )-
!  -01   -03  +--------------+     -02                                      -12
```

CROSS REFERENCE

```
I/00001-12    PROD. FLOW  5%
0024-( )-     0027-] [-      0031-]/[-     0032-]/[-
```

RUNG0025
```
!
!
!RESET                                                                     PRESET
!P.B.                                                                      COMPAR
! 0001                                                                     ISON
                                                                           0012
+--] [-+------+------+------+------+------+------+------+------+------+--(U)-
!  -03                                                                      -01
```

CROSS REFERENCE

```
I/00012-01    PRESETCOMPARISON
0020-(L)-     0021-] [-      0025-(U)-     0031-] [-
```

RUNG0026                      R50 PRESET THOUS.WT.  R51 PRESET HUNDR.WT.
```
!
!RESET                                                                     PRESET
!P.B.                                                                      COMPAR
! 0001                                                                     ISON
                                                                           0012
+--] [-+------+------+------+------+------+------+------+------+------+--(U)-
!  -03                                                                      -02
```

CROSS REFERENCE

```
I/00012-02    PRESETCOMPARISON
0021-(L)-     0022-]/[-      0023-]/[-     0024-]/[-     0026-(U)-

0028-] [-     0031-] [-
```

```
RUNG0027
!
!PROD.                                                                          DUST
!FLOW                                                                           COL-
!20%                                                                            LECTOR
! 0001                                                                          0001
+--] [-+-------+-------+-------+-------+-------+-------+-------+-------+-------+--( )-
!  -13                                                                           -13
!
!PROD.  !
!FLOW   !
!10%    !
! 0001  !
+--] [--+   +   +   +   +   +   +   +   +   +
!  -11  !
!       !
!PROD.  !
!FLOW   !
!5%     !
! 0001  !
+--] [--+   +   +   +   +   +   +   +   +   +
!  -12

CROSS REFERENCE

I/O0001-13    DUST COL-  LECTOR
0027-( )-         0028-]/[-
```

```
RUNG0028                    TO TIME CLEAN OUT OF LOAD SPOUT
                                                                              +-TMR--+
+-------+-------+-------+-------+-------+-------+-------+-------+-------+-----+!TIME  !
!                                                                             !      !
!                                                                             !CLEAN !
!                                                                             !OUT   !
!                                                                             !      !
+   +   +   +   +   +   +   +   +   +   +!S0022 !
!                                                                             !      !
!DUST    PRESET                                                               !      !
!COL-    COMPAR                                                               !      !
!LECTOR  ISON                                                                 !      !
! 0001   0012                                                                 !      !
+--]/[-+--] [-+-------+-------+-------+-------+-------+-------+-------+-------+!CLEAR !
!  -13   -02                                                                  !      !
!                                                                             !      !
+   +   +   +   +   +   +   +   +   +   +! .18  !
!                                                                             !      !
!                                                                             !      !
+   +   +   +   +   +   +   +   +   +   +!=0100 !
!                                                                             !      !
!                                                                             !CLEAN !
!                                                                             !OUT   !
!                                                                             ! 0017 !
+   +   +   +   +   +   +   +   +   +   +!--( )-!
!                                                                             +---06-+

CROSS REFERENCE

S0022    CLEAN OUT
0028 TMR        0029 IF  (02)

I/O0017-06   CLEAN OUT
0028 TMR
```

```
RUNG0029
!
!         CLEAN               CLEAN
!         OUT                 OUT
!+------------------+ +------------------+                                              0012
+!IF    S0022 )0020 !+!IF    S0022 (0040 !+----------+----------+----------+----------+--( )-
!+------------------+ +------------------+                                               -05

CROSS REFERENCE
_____      _____

I/00012-05
0018-] [-         0029-( )-

RUNG0030
                                                                                  +-TMR--+
+----------+----------+----------+----------+----------+----------+----------+----+!TIME !
!                                                                                 !      !
!                                                                                 !      !
!                                                                                 !LOAD  !
!                                                                                 !TIMER !
!                                                                                 !      !
+     +     +     +     +     +     +     +     +     +                          +!S0021 !
!                                                                                 !      !
!                                                                                 !      !
!40'   40'TR.                                                                     !      !
!TRUCK INFL.  START                                                               !      !
!RELAY TMR    RELAY                                                               !      !
! 0010  0017   0009                                                               !      !
+--] [-+--] [-+--] [-+----------+----------+----------+----------+----------+----+!CLEAR !
!  -04    -03    -01                                                              !      !
!                                                                                 !      !
!                                                                                 !      !
+     +     +     +     +     +     +     +     +     +                          +! .1M  !
!                                                                                 !      !
!                                                                                 !      !
!                                                                                 !      !
+     +     +     +     +     +     +     +     +     +                          +!     !
!                                                                                 !      !
!                                                                                 !      !
!                                                                                 !=0080 !
!                                                                                 !      !
!                                                                                 ! 0017 !
+     +     +     +     +     +     +     +     +     +                          +!--( )-!
!                                                                                 +---05-+

CROSS REFERENCE

S0021     LOAD   TIMER
0019 IF  (02)    0022 IF        0024 IF        0030 TMR

I/00017-05
0030 TMR

RUNG0031                              PRESS STOP TO PRINT; THEN PRESS RESET

!PROD.  PROD.  PROD.  PRESET PRESET                                                RESET
!FLOW   FLOW   FLOW   COMPAR COMPAR                                                UN-
!20%    10%    5%     ISON   ISON                                                  LATCH
! 0001  0001   0001    0012   0012                                                 0009
+--]/[-+--]/[-+--]/[-+--] [-+--] [-+----------+----------+----------+----------+--( )-
!  -10    -11    -12    -01    -02                                                 -04
```

```
CROSS REFERENCE

1/00009-04      RESET UN-   LATCH
0013-] [-       0031-( )-

RUNG0032
!
!        .PROD.  PROD.  PROD.
!STOP    FLOW   FLOW    FLOW
!P.B.    20%    10%     5%
! 0001   0001   0001    0001                       +------ STAT--REMOTE- CODE+
+--] [-+--]/[-+--]/[-+--]/[-+-------+-------+------TALRM2 S0060  S8101   0001!
!  -02   -10    -11     -12                        +------------------------+

CROSS REFERENCE

S0060
0032ALARM
```

END OF PROGRAM

It will be readily observed from the foregoing detailed description of the invention and from the illustrated embodiment thereof that numerous variations and modifications may be effected without departing from the true spirit and scope of the novel concepts or principles of this invention.

What is claimed is:

1. A system for bulk loading a container through an opening therein with fluent material, including flowable communicated solids and the like, from a storage bin above the container, said system comprising:
   (a) a discharge conduit having an inlet end and an outlet end, said inlet end of said discharge conduit being connected to said storage bin and said outlet end of said discharge conduit being movable at least vertically;
   (b) an exhaust conduit having an inlet end and an outlet end and being adjacent said discharge conduit and associated dust collection means for effecting flow of dust through said exhaust conduit, said outlet end of said exhaust conduit being connected to said dust collection means and said inlet end of said exhaust conduit being movable at least vertically;
   (c) a discharge spout having an inlet for being releasably connected to said discharge conduit outlet and having an outlet for communicating with said container opening;
   (d) gas injection means for injecting gas into said discharge spout;
   (e) an exhaust spout having an outlet for being releasably connected to said exhaust conduit inlet and having an inlet for communicating with said container opening; and
   (f) support means for supporting said discharge and exhaust spouts for movement together between (1) a loading position wherein said spouts communicate with said container opening and can be connected with said conduits and (2) a retracted position wherein said spouts are spaced away from said container opening and said conduits to accommodate the movement of said container therepast.

2. The system in accordance with claim 1 in which said support means includes a frame, a platform mounted on said frame for movement in a first path toward and away from said conduits, and a carriage that carries said spouts and that is mounted on said platform for movement relative to said platform along a second path normal to said first path toward and away from said container.

3. The system in accordance with claim 2 in which said platform comprises (1) a first part; (2) a second part hinged to said first part; and (3) an actuator means connected between said first and second parts for pivoting said second part relative to said first part between an extended horizontal position and a retracted raised position.

4. The system in accordance with claim 1 in which said discharge conduit and said exhaust conduit are extendible and retractable.

5. The system in accordance with claim 4 further including counterweight means connected to said conduits for raising the outlet end of said discharge conduit and the inlet end of said exhaust conduit when said conduits are disconnected from said spouts.

6. The system in accordance with claim 1 in which said gas injection means includes a gas supply conduit connected to said discharge spout.

7. The system in accordance with claim 1 in which said discharge spout and said exhaust spout are mounted together on said support means to prevent relative movement between said spouts while permitting said spouts to be moved together.

8. The system in accordance with claim 1 in which said system includes a pass-through container loading station for receiving said container in a loading position in which said support means includes a platform movable adjacent to said container when said container is in said loading position and below said discharge and exhaust conduits; in which said system includes (1) motor drive means for moving said platform, (2) detector means for detecting the rear end of said container when said rear end moves past a predetermined location in said loading station and for providing a signal upon said detection, and (3) control means responsive to said detector means signal for permitting operation of said motor drive means.

9. The system in accordance with claim 1 in which further including (1) valve means in said discharge conduit and in said exhaust conduit; (2) valve operating means for operating said valve means to open and close said conduits; (3) scale means upon which said container is located during loading for measuring the weight of said container and providing a weight control signal corresponding to the measured weight; and (4) control means for controlling said valve operating means to close in response to said weight control signal.

10. A system for bulk loading fluent material, including flowable comminuted solids and the like, into a container through an opening in said container, said system comprising:
    (a) a pass-through container loading station for receiving said container in a stationary position for loading;
    (b) a storage bin means for holding said material and for discharging said material from an elevation above said container opening;
    (c) an extendable and retractable-discharge conduit connected with said storage bin means;
    (d) an exhaust conduit adjacent said discharge conduit and associated dust collection means for effecting flow of dust through said exhaust conduit;
    (e) a movable platform and associated platform moving means for moving said platform between a loading position below said discharge conduit and a clearance position laterally spaced from said discharge conduit to accommodate the movement of the container into said loading station;
    (f) a discharge spout having an inlet for being releasably connected to said discharge conduit and having an outlet for communicating with said container opening;
    (g) gas injection means for injecting gas into said discharge spout;
    (h) an exhaust spout having an outlet for being releasably connected to said exhaust conduit and having an inlet for communicating with said container opening; and
    (i) carriage means on said platform for supporting said discharge and exhaust spouts for movement between (1) an extended position wherein said discharge and exhaust spouts communicate with said container opening and can be connected with said conduits and (2) a retracted position wherein said spouts are spaced away from said container opening and said conduits to accommodate the movement of said container therepast.

11. A connector assembly for bulk loading fluent material, including flowable comminuted solids and the like, from an elevated storage bin into a container through an opening in said container when said container is located in a loading station below said storage bin, said connector assembly comprising:
    (a) a discharge conduit that is connected in communication with said storage bin and that is movable between (a) a retracted position to accommodate the movement of the container into the loading station and (2) a downwardly extended position; and
    (b) a discharge spout and support means for supporting said discharge spout for movement along (1) a first path toward and away from said discharge conduit to accommodate passage of the container into the loading station and (2) a second path normal to said first path toward and away from said first path, said discharge spout having an inlet for being releasably connected to said discharge conduit and having an outlet for communicating with said container opening; which assembly is adapted for use with a dust collection system during the loading of said container which also has a flexible envelope lining and which assembly further includes: a flexible exhaust conduit that is adjacent said discharge conduit and that is connected on one end to said dust collection system; an exhaust spout mounted on said support means with said discharge spout, said exhaust spout having an outlet for being releasably connected to the other end of said exhaust conduit and an inlet for communicating with said container opening; and gas injection means for injecting gas into said discharge spout for inflating said envelope lining.

12. A controlled system for bulk loading a flexible container through an opening therein with fluent material, including a flowable comminuted solids and the like, from a storage bin above the container, said system comprising:
    (a) material discharge transfer means communicating with said storage bin for directing flow of said material to said container opening;
    (b) gas transfer means for supplying gas from a source to said container;
    (c) discharge valve means in said material discharge transfer means for regulating the flow of said material through said material discharge transfer means;
    (d) exhaust transfer means for communicating with said container opening and effecting an exhaust flow of dust from said container;
    (e) exhaust valve means in said exhaust transfer means for regulating exhaust flow from said container;
    (f) gas injection valve means in said gas transfer means for regulating the flow of gas into said container;
    (g) valve operating means for operating said discharge valve means, said exhaust valve means, and said gas injection valve means;
    (h) scale means upon which said container is located during loading for measuring the weight of said container and providing a weight control signal corresponding to the measured weight; and
    (i) control means for controlling said valve operating means to:
        (1) open said gas injection valve means for a predetermined inflation time interval to inflate the container while maintaining said discharge and exhaust valve means closed;
        (2) open said discharge and exhaust valve means at the end of said predetermined inflation time interval whereby said material flows into said container as the dust is exhausted therefrom; and
        (3) receive said weight control signal and close said discharge and exhaust valve means in response to the weight control signal corresponding to a predetermined measured weight.

13. The controlled system in accordance with claim 12 in which said control means further includes means for controlling said valve operating means to open said gas injection valve means for a predetermined clean-out time interval following the closing of said discharge valve means.

14. The controlled system in accordance with claim 12 in which said control means further includes means for controlling said valve operating means to open and close said gas inflation valve means while said discharge valve means is open whereby the distribution of the material flowing into said container is varied.

15. The controlled system in accordance with claim 12 in which said control means further includes means for controlling said valve operating means to adjust said discharge valve means to decrease the flow rate of said material into said container as a function of time prior to fully closing said discharge valve means.

16. The controlled system in accordance with claim 12 in which said control means includes a programmable controller.

17. A process for bulk loading a flexible, collapsed container through an opening therein with particulate material from a storage bin above the container, said process comprising:
 (a) positioning said container on a scale in a loading station below said bin;
 (b) inflating said flexible container with gas;
 (c) measuring the weight of said container on said scale prior to effecting the following step (d);
 (d) discharging said material from said bin into said container;
 (e) exhausting said container interior ambient atmosphere during step (d);
 (f) monitoring the weight of said container on said scale during step (d);
 (g) terminating steps (d) and (e) when the monitored weight reaches a predetermined value in excess of the weight measured in step (c).

18. The process in accordance with claim 17 in which step (a) includes: (1) advancing said container onto said scale in said loading station; (2) detecting the movement of the rear end of said container past a predetermined location in said loading station; and (3) terminating the advancement of said container in response to said detection of the container rear end.

19. The process in accordance with claim 17 in which step (b) includes injecting said gas into said container for a predetermined time interval.

20. The process in accordance with claim 17 in which steps (c) and (f) include positioning said container on a scale and generating a weight control signal corresponding to the measured weight; in which step (d) includes connecting a discharge conduit and discharge valve between said bin and said container and then opening said discharge valve; in which step (e) includes connecting an exhaust conduit and exhaust valve between said container and means for effecting an exhaust flow of dust from said container and then opening said exhaust valve; in which step (g) includes closing said discharge valve and said exhaust valve in response to the weight control signal corresponding to the predetermined value of said measured weight.

21. The process in accordance with claim 17 in which the process includes the further manipulation, during step (d), of injecting said gas into said container to vary the distribution of said material in said container.

22. The process in accordance with claim 17 in which step (d) further includes decreasing the flow rate of said material into said container as a function of time prior to effecting step (g).

23. The process in accordance with claim 17 in which said process includes the following steps prior to step (d): (1) connecting one end of a discharge conduit to communicate with said bin, (2) connecting a rigid discharge charge spout to the other end of said rigid discharge conduit, (3) connecting a source of said gas to said rigid discharge spout, and (4) inserting said rigid discharge spout into an opening in said container.

24. The process in accordance with claim 22 in which step (b) includes injecting gas into said rigid discharge spout; in which step (d) includes discharging said material through said discharge conduit and discharge spout into said container; and in which said process further includes, after step (g), the step of injecting said gas into said rigid discharge spout to blow any deposits of said material out of said spout into said container.

25. The process in accordance with claim 23 in which said rigid discharge spout is provided on a movable platform and in which said process includes, between steps (a) and (b), the step of moving said platform adjacent said container.

* * * * *